(12) United States Patent
Kasada

(10) Patent No.: US 11,670,332 B2
(45) Date of Patent: *Jun. 6, 2023

(54) MAGNETIC TAPE, MAGNETIC TAPE CARTRIDGE, AND MAGNETIC TAPE APPARATUS

(71) Applicant: FUJIFILM Corporation, Tokyo (JP)

(72) Inventor: Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/477,087

(22) Filed: Sep. 16, 2021

(65) Prior Publication Data

US 2022/0005504 A1 Jan. 6, 2022

Related U.S. Application Data

(63) Continuation of application No. 16/522,806, filed on Jul. 26, 2019.

(30) Foreign Application Priority Data

Jul. 27, 2018 (JP) .............................. JP2018-141813

(51) Int. Cl.
  *G11B 5/702* (2006.01)
  *G11B 5/706* (2006.01)
  *H01F 1/08* (2006.01)

(52) U.S. Cl.
  CPC ......... *G11B 5/70605* (2013.01); *H01F 1/083* (2013.01); *G11B 5/7021* (2013.01)

(58) Field of Classification Search
  CPC ............... G11B 5/00813; G11B 5/702; G11B 5/70678; G11B 5/735; G11B 5/78; G11B 2220/956; G11B 5/07
  See application file for complete search history.

(56) References Cited

U.S. PATENT DOCUMENTS

| | | |
|---|---|---|
| 4,590,524 A | 5/1986 | Okamoto et al. |
| 4,727,438 A | 2/1988 | Juso et al. |
| 4,988,562 A | 1/1991 | Ryoke et al. |
| 5,305,159 A | 4/1994 | Sakai et al. |
| 5,544,140 A | 8/1996 | Seagrave et al. |
| 5,606,469 A | 2/1997 | Kosugi et al. |
| 6,033,760 A | 3/2000 | Wakana et al. |
| 6,579,592 B1 | 6/2003 | Matsubaguchi et al. |
| 6,744,585 B1 | 6/2004 | Nishida et al. |
| 7,092,199 B2 | 8/2006 | Nakamura et al. |
| 7,187,511 B2 | 3/2007 | Nakao |
| 7,494,728 B2 | 2/2009 | Kuse et al. |
| 7,532,425 B2 | 5/2009 | Abe et al. |
| 7,755,863 B2 | 7/2010 | Neumann et al. |
| 8,861,111 B1 | 10/2014 | Liao et al. |
| 8,947,821 B1 | 2/2015 | Blinick et al. |
| 9,928,854 B1 | 3/2018 | Jury et al. |
| 9,978,414 B1 | 5/2018 | Kaneko et al. |
| 10,074,393 B2 | 9/2018 | Kaneko et al. |
| 10,504,546 B2 | 12/2019 | Kaneko et al. |
| 10,510,369 B2 | 12/2019 | Kaneko et al. |
| 10,643,646 B2 | 5/2020 | Kasada et al. |
| 10,643,647 B2 | 5/2020 | Kasada et al. |
| 10,679,655 B2 | 6/2020 | Ozawa et al. |
| 10,692,528 B2 | 6/2020 | Ozawa et al. |
| 10,706,875 B2 | 7/2020 | Kasada et al. |
| 10,755,735 B2 | 8/2020 | Ozawa et al. |
| 10,755,741 B2 | 8/2020 | Ozawa et al. |
| 10,789,981 B2 | 9/2020 | Musha |
| 2003/0095353 A1 | 5/2003 | Nakao |
| 2003/0142431 A1 | 7/2003 | Eijiri et al. |
| 2003/0228493 A1* | 12/2003 | Doushita ............... G11B 5/7356 |
| 2006/0068232 A1 | 3/2006 | Mikamo et al. |
| 2006/0119969 A1 | 6/2006 | Hutchins et al. |
| 2011/0110210 A1 | 5/2011 | Honma |
| 2012/0003503 A1 | 1/2012 | Mori |
| 2012/0196156 A1 | 8/2012 | Suzuki |
| 2012/0244387 A1 | 9/2012 | Mori et al. |
| 2014/0272474 A1 | 9/2014 | Kasada |
| 2015/0029608 A1 | 1/2015 | Mathew et al. |
| 2016/0064025 A1 | 3/2016 | Kurokawa et al. |

(Continued)

FOREIGN PATENT DOCUMENTS

| | | |
|---|---|---|
| JP | 59-221830 A | 12/1984 |
| JP | 1-318953 A | 12/1989 |

(Continued)

OTHER PUBLICATIONS

Office Action dated Mar. 3, 2020 in Japanese Application No. 2017-123041; corresponds to U.S. Appl. No. 16/009,570.
Notice of Allowance dated Feb. 20, 2020 in U.S. Appl. No. 16/456,745.
Notice of Allowance dated Mar. 13, 2020 in U.S. Appl. No. 16/456,831.
Notice of Allowance dated Jan. 13, 2020 in U.S. Appl. No. 16/456,970.
Notice of Allowance dated May 5, 2020 in U.S. Appl. No. 16/456,965.
Notice of Allowance dated Jan. 31, 2020 in U.S. Appl. No. 16/456,811.
Office Action dated Jan. 21, 2020 in U.S. Appl. No. 16/456,780.
Notice of Allowance dated Feb. 25, 2020 in U.S. Appl. No. 16/456,459.

(Continued)

*Primary Examiner* — Holly Rickman
*Assistant Examiner* — Linda N Chau
(74) *Attorney, Agent, or Firm* — Sughrue Mion, PLLC

(57) ABSTRACT

The magnetic tape includes a non-magnetic support; a magnetic layer including ferromagnetic powder and a binding agent on one surface side of the non-magnetic support; and a back coating layer including non-magnetic powder and a binding agent on the other surface side of the non-magnetic support, in which an isoelectric point of a surface zeta potential of the magnetic layer is equal to or smaller than 3.8, and an isoelectric point of a surface zeta potential of the back coating layer is equal to or smaller than 3.0, a magnetic tape cartridge, and a magnetic tape apparatus including this magnetic tape.

21 Claims, No Drawings

(56) References Cited

U.S. PATENT DOCUMENTS

| | | |
|---|---|---|
| 2016/0093322 A1 | 3/2016 | Kasada et al. |
| 2016/0171993 A1 | 6/2016 | Okubo |
| 2017/0004856 A1 | 1/2017 | Tada et al. |
| 2017/0186460 A1 | 6/2017 | Kasada et al. |
| 2017/0372738 A1 | 12/2017 | Kasada |
| 2018/0082710 A1 | 3/2018 | Tada et al. |
| 2018/0358044 A1 | 12/2018 | Shirata et al. |
| 2018/0358046 A1 | 12/2018 | Shirata et al. |
| 2018/0374503 A1 | 12/2018 | Kasada |
| 2018/0374504 A1 | 12/2018 | Kasada |
| 2018/0374505 A1 | 12/2018 | Kasada et al. |
| 2018/0374506 A1 | 12/2018 | Kasada |
| 2018/0374507 A1 | 12/2018 | Kasada |
| 2019/0295586 A1 | 9/2019 | Kasada |
| 2019/0295589 A1 | 9/2019 | Kasada |
| 2020/0005814 A1 | 1/2020 | Kasada et al. |
| 2020/0005817 A1 | 1/2020 | Ozawa et al. |
| 2020/0005818 A1 | 1/2020 | Kasada et al. |
| 2020/0005822 A1 | 1/2020 | Kasada et al. |
| 2020/0005827 A1 | 1/2020 | Ozawa et al. |
| 2020/0005828 A1 | 1/2020 | Ozawa et al. |
| 2020/0035267 A1 | 1/2020 | Kasada |
| 2020/0251134 A1 | 8/2020 | Kasada et al. |
| 2020/0251140 A1 | 8/2020 | Ozawa et al. |
| 2021/0082464 A1 | 3/2021 | Ozawa et al. |
| 2021/0249043 A1 | 8/2021 | Kasada et al. |
| 2022/0005503 A1 | 1/2022 | Kasada et al. |

FOREIGN PATENT DOCUMENTS

| | | |
|---|---|---|
| JP | 2-168415 A | 6/1990 |
| JP | 3-109701 A | 5/1991 |
| JP | 09-190623 A | 7/1997 |
| JP | 2002-8910 A | 1/2002 |
| JP | 2006-54018 A | 2/2006 |
| JP | 2008-282501 A | 11/2008 |
| JP | 2009-32338 A | 2/2009 |
| JP | 2011-134372 A | 7/2011 |
| JP | 2012-14809 A | 1/2012 |
| JP | 2012-155805 A | 8/2012 |
| JP | 2012-203956 A | 10/2012 |
| JP | 2016-110680 A | 6/2016 |
| JP | 2019-008847 A | 1/2019 |
| JP | 2019-008848 A | 1/2019 |
| JP | 2019-008849 A | 1/2019 |
| JP | 2019-008850 A | 1/2019 |
| JP | 2019-008851 A | 1/2019 |
| JP | 6691511 B2 | 4/2020 |
| JP | 6691512 B2 | 4/2020 |
| JP | 6691513 B2 | 4/2020 |
| JP | 6691514 B2 | 4/2020 |

OTHER PUBLICATIONS

Office Action dated Nov. 4, 2019 in U.S. Appl. No. 16/401,776.
Office Action dated Feb. 24, 2020 in U.S. Appl. No. 16/401,776.
Office Action dated Jan. 21, 2021 in U.S. Appl. No. 16/522,806.
Hanaor et al., "Anodic aqueous electrophoretic deposition of titanium dioxide using carboxylic acids as dispersing agents", Journal of the European Ceramic Society, 2011, vol. 31, No. 6, pp. 1041-1047 (7 pages total).
Office Action dated Feb. 18, 2021 in U.S. Appl. No. 16/009,570.
Office Action dated Jan. 12, 2021 in Japanese Application No. 2020-177690, corresponds to U.S. Appl. No. 16/522,806.
Office Action dated Jun. 30, 2020 in U.S. Appl. No. 16/777,312.
Office Action dated Oct. 22, 2020 in U.S. Appl. No. 16/777,312.
Notice of Allowance dated Jan. 27, 2021 in U.S. Appl. No. 16/777,312.
Notice of Allowance dated Mar. 16, 2021 in U.S. Appl. No. 16/777,312.
Notice of Allowance dated Jul. 8, 2021 in U.S. Appl. No. 16/009,570.
Notice of Allowance dated Jul. 13, 2021 in U.S. Appl. No. 16/522,806.
Office Action dated Apr. 27, 2021 in Japanese Application No. 2020-122791, corresponds to U.S. Appl. No. 17/022,919.
Office Action dated Aug. 31, 2021 in U.S. Appl. No. 17/022,919.
Office Action dated Dec. 7, 2021 in Japanese Application No. 2019-016523, corresponds to U.S. Appl. No. 16/777,312.
Office Action dated Feb. 14, 2022 in U.S. Appl. No. 17/022,919.
Office Action dated Feb. 15, 2022 in U.S. Appl. No. 16/009,570.
Office Action dated Nov. 8, 2021 in U.S. Appl. No. 17/242,798.
Notice of Allowance dated Mar. 15, 2022 in U.S. Appl. No. 17/242,798.
Office Action dated Mar. 24, 2022 in U.S. Appl. No. 16/522,806.
U.S. Appl. No. 17/476,565, filed Sep. 16, 2021 (Kasada).
Notice of Allowance dated Sep. 16, 2022 in U.S. Appl. No. 17/476,565.
Office Action dated May 25, 2022 in U.S. Appl. No. 17/476,565.
Notice of Allowance dated Jun. 10, 2022 in U.S. Appl. No. 16/009,570.
Notice of Allowance dated Jul. 11, 2022 in U.S. Appl. No. 16/522,806.

* cited by examiner

MAGNETIC TAPE, MAGNETIC TAPE CARTRIDGE, AND MAGNETIC TAPE APPARATUS

CROSS-REFERENCE TO RELATED APPLICATIONS

This application is a Continuation of U.S. application Ser. No. 16/522,806 filed Jul. 26, 2019, which claims priority under 35 U.S.C 119 to Japanese Patent Application No. 2018-141813 filed on Jul. 27, 2018. The above applications are hereby expressly incorporated by reference, in their entirety, into the present application.

BACKGROUND OF THE INVENTION

1. Field of the Invention

The present invention relates to a magnetic tape, a magnetic tape cartridge, and a magnetic tape apparatus.

2. Description of the Related Art

Magnetic recording media are divided into tape-shaped magnetic recording media and disk-shaped magnetic recording media, and tape-shaped magnetic recording media, that is, magnetic tapes are mainly used for storage such as data back-up.

As the magnetic tapes, a magnetic tape including a back coating layer on a surface side of a non-magnetic support opposite to a surface side provided with a magnetic layer has been disclosed in JP1997-190623A (JP-H09-190623A).

SUMMARY OF THE INVENTION

A magnetic tape is generally accommodated in a magnetic tape cartridge in a state of being wound around a reel. The recording of information on the magnetic tape and the reproducing thereof are generally performed by setting a magnetic tape cartridge in a magnetic tape apparatus called a drive, and causing the magnetic tape to run in the magnetic tape apparatus, and causing a surface of the magnetic tape (surface of a magnetic layer) and a magnetic head to come into contact with each other for sliding.

The magnetic tape is used in a data center in which a temperature and humidity are controlled. In addition, a temperature and humidity of a storage environment before shipping of the magnetic tape cartridge accommodating the magnetic tape are also controlled.

Meanwhile, in the data center, power saving is required for cost reduction. In order to realize the power saving, it is desirable to further alleviate the controlling conditions of a usage environment of the magnetic tape in the data center than current conditions or make the control unnecessary. This viewpoint applies to the storage environment of the magnetic tape cartridge.

However, it is assumed that, in a case where the controlling conditions of the usage environment and/or the storage environment are alleviated or the controlling thereof is not performed, the magnetic tape is exposed to an environmental change due to a change in the weather, a change of the season, and the like. As one aspect of such an environmental change, a temperature change from a low temperature to a high temperature under high humidity is considered.

Regarding the point described above, from the studies of the inventors, it is determined that, in a magnetic tape including a back coating layer on a surface side of a non-magnetic support opposite to a surface side provided with a magnetic layer, in a case where the sliding between a surface of the magnetic tape and a magnetic head is repeated, after a temperature change from a low temperature to a high temperature under high humidity occurs, a frequency of generation of a partial decrease in reproducing signal amplitude (referred to as "missing pulse") increases, during the reproducing of information recorded on the magnetic tape. As the generation frequency of the missing pulse increases, an error rate increases and reliability of a magnetic tape is deteriorated.

One aspect of the invention provides for a magnetic tape including a back coating layer on a surface side of a non-magnetic support opposite to a surface side provided with a magnetic layer, in which a generation frequency of missing pulse is low, even in a case where sliding between a surface of the magnetic tape and a magnetic head is repeated, after the magnetic tape is exposed to a temperature change from a low temperature to a high temperature under high humidity.

According to one aspect of the invention, there is provided a magnetic tape comprising: a non-magnetic support; a magnetic layer including ferromagnetic powder and a binding agent on one surface side of the non-magnetic support; and a back coating layer including non-magnetic powder and a binding agent on the other surface side of the non-magnetic support, in which an isoelectric point of a surface zeta potential of the magnetic layer is equal to or smaller than 3.8, and an isoelectric point of a surface zeta potential of the back coating layer is equal to or smaller than 3.0.

In one aspect, the isoelectric point of a surface zeta potential of the magnetic layer may be 2.5 to 3.8.

In one aspect, the isoelectric point of a surface zeta potential of the back coating layer may be 2.0 to 3.0.

In one aspect, the binding agent of the magnetic layer may be a binding agent including an acidic group.

In one aspect, the binding agent of the back coating layer may be a binding agent including an acidic group.

In one aspect, the acidic group may include at least one kind of acidic group selected from the group consisting of a sulfonic acid group and a salt thereof.

In one aspect, the magnetic tape may further comprise a non-magnetic layer including non-magnetic powder and a binding agent between the non-magnetic support and the magnetic layer.

According to another aspect of the invention, there is provided a magnetic tape cartridge comprising: the magnetic tape described above.

According to still another aspect of the invention, there is provided a magnetic tape apparatus comprising: the magnetic tape described above; and a magnetic head.

According to one aspect of the invention, it is possible to provide a magnetic tape including a back coating layer on a surface side of a non-magnetic support opposite to a surface side provided with a magnetic layer, in which a generation frequency of missing pulse is low, even in a case where sliding between a surface of the magnetic tape and a magnetic head is repeated, after the magnetic tape is exposed to a temperature change from a low temperature to a high temperature under high humidity. In addition, according to one aspect of the invention, it is possible to provide a magnetic tape cartridge and a magnetic tape apparatus including the magnetic tape described above.

DESCRIPTION OF THE PREFERRED EMBODIMENTS

Magnetic Tape

One aspect of the invention relates to a magnetic tape including: a non-magnetic support; a magnetic layer including ferromagnetic powder and a binding agent on one surface side of the non-magnetic support; and a back coating layer including non-magnetic powder and a binding agent on the other surface side of the non-magnetic support, in which an isoelectric point of a surface zeta potential of the magnetic layer is equal to or smaller than 3.8, and an isoelectric point of a surface zeta potential of the back coating layer is equal to or smaller than 3.0.

Hereinafter, the magnetic tape will be described more specifically. In the invention and the specification, a "surface of the magnetic layer" is identical to the surface of the magnetic tape on the magnetic layer side, and a "surface of the back coating layer" is identical to the surface of the magnetic tape on the back coating layer side.

Isoelectric Point of Surface Zeta Potential

In the magnetic tape, the isoelectric point of the surface zeta potential of the magnetic layer is equal to or smaller than 3.8, and the isoelectric point of the surface zeta potential of the back coating layer is equal to or smaller than 3.0. In the invention and the specification, the isoelectric point of the surface zeta potential of each layer is a value of pH, in a case where a surface zeta potential measured by a flow potential method (also referred to as a flow current method) becomes zero. A sample is cut out from the magnetic tape which is a measurement target, and the sample is disposed in a measurement cell so that the surface of a layer which is a target for obtaining the surface zeta potential (surface of magnetic layer or back coating layer) comes into contact with an electrolyte. Pressure in the measurement cell is changed to flow the electrolyte and a flow potential at each pressure is measured, and then, the surface zeta potential is obtained by the following calculation expression.

Calculation Expression $$\zeta = \frac{dI}{dp} \times \frac{\eta}{\varepsilon\varepsilon_0} \frac{L}{A}$$

[$\zeta$: surface zeta potential, p: pressure, I: flow potential, $\eta$: viscosity of electrolyte, $\varepsilon$: relative dielectric constant of electrolyte, $\varepsilon_0$: dielectric constant in a vacuum state, L: length of channel (flow path between two electrodes), A: area of cross section of channel]

The pressure is changed in a range of 0 to 400,000 Pa (0 to 400 mbar). The calculation of the surface zeta potential by flowing the electrolyte to the measurement cell and measuring a flow potential is performed by using electrolytes having different pH (from pH of 9 to pH of 3 at interval of approximately 0.5). A total number of measurement points is 13 from the measurement point of pH 9 to the 13th measurement points of pH 3. By doing so, the surface zeta potential of each measurement point of pH is obtained. As pH decreases, the surface zeta potential decreases. Thus, two measurement points at which polarity of the surface zeta potential changes (a change from a positive value to a negative value) may appear, while pH decreases from 9 to 3. In a case where such two measurement points appear, pH, in a case where the surface zeta potential is zero, is obtained by interpolation by using a straight line (linear function) showing a relationship between the surface zeta potential and pH of each of the two measurement points. Meanwhile, in a case where all of the surface zeta potentials obtained during the decrease of pH from 9 to 3 is positive value, pH, in a case where the surface zeta potential is zero, is obtained by extrapolation by using a straight line (linear function) showing a relationship between the surface zeta potential and pH of the 13th measurement point (pH of 3) which is the final measurement point and the 12th measurement point. On the other hand, in a case where all of the surface zeta potentials obtained during the decrease of pH from 9 to 3 is negative value, pH, in a case where the surface zeta potential is zero, is obtained by extrapolation by using a straight line (linear function) showing a relationship between the surface zeta potential and pH of the first measurement point (pH of 9) which is the initial measurement point and the 12th measurement point. By doing so, the value of pH, in a case where the surface zeta potential of the magnetic layer measured by the flow potential method is zero, is obtained.

The above measurement is performed three times in total at room temperature by using different samples cut out from the same magnetic tape (magnetic tape which is a measurement target), and pH, in a case where the surface zeta potential in each measurement is zero, is obtained. For the viscosity and the relative dielectric constant of the electrolyte, a measurement value at room temperature is used. The room temperature is set as 20° C. to 27° C. Regarding the magnetic layer, an arithmetical mean of three pHs obtained as described above is an isoelectric point of the surface zeta potential of the magnetic layer of the magnetic tape which is a measurement target. In addition, regarding the back coating layer, an arithmetical mean of three pHs obtained as described above is an isoelectric point of the surface zeta potential of the back coating layer of the magnetic tape which is a measurement target. As the electrolyte having pH of 9, an electrolyte obtained by adjusting pH of a KCl aqueous solution having a concentration of 1 mmol/L to 9 by using a KOH aqueous solution having a concentration of 0.1 mol/L is used. As the electrolyte having other pH, an electrolyte obtained by adjusting pH of the electrolyte having pH of 9, which is adjusted as described above, by using an HCl aqueous solution having a concentration of 0.1 mol/L is used.

The isoelectric point of the surface zeta potential measured by the method described above is an isoelectric point obtained regarding the surface of the magnetic layer or the back coating layer. As a result of the intensive studies, the inventors have newly found that, by setting the isoelectric point of the surface zeta potential of the magnetic layer to be equal to or smaller than 3.8 and setting the isoelectric point of the surface zeta potential of the back coating layer to be equal to or smaller than 3.0, it is possible to decrease a generation frequency of a missing pulse due to a temperature change from a low temperature to a high temperature under high humidity. In regards to this point, the inventors have surmised as follows. However, the following description is merely a surmise, and the invention is not limited thereto.

Scraps (may be referred to as debris) may be generated due to chipping of the surface of the magnetic layer during the sliding between the surface of the magnetic tape (surface of the magnetic layer) and the magnetic head. The inventors have surmised that, in a case where the magnetic tape is exposed to a temperature change from a low temperature to a high temperature under high humidity, a component of the magnetic layer is precipitated on the surface of the magnetic layer, thereby easily generating a precipitate on the surface of the magnetic layer. It is thought that, in a case where the scraps and/or the precipitate is strongly stuck to the surface of the magnetic layer, a contact state between the surface of the magnetic layer and the magnetic head is not stabilized, thereby easily generating a partial decrease of a reproducing signal amplitude (missing pulse). With respect to this, the inventors have thought that, in a case of using the magnetic layer in a region of acidic pH in which the isoelectric point of the surface zeta potential is equal to or smaller than 3.8, a repulsive force may be easily applied between the scraps and/or precipitate and the surface of the magnetic layer. The inventors have surmised that preventing the scraps and/or precipitate from being strongly stuck to the surface of the magnetic layer by this repulsive force may contribute to a decrease in the generation frequency of the missing pulse.

In addition, the inventors have surmised that, in a case where the magnetic tape is exposed to a temperature change from a low temperature to a high temperature under high humidity, a component of the back coating layer is precipitated, thereby easily generating a precipitate on the surface of the back coating layer. It is thought that, in a case where this precipitate is strongly stuck to the surface of the back coating layer, stability of a running state of the magnetic tape is deteriorated. Due to this reason, it is also surmised that the missing pulse is easily generated. With respect to this, the inventors have thought that, in a case of using the back coating layer in a region of acidic pH in which the isoelectric point of the surface zeta potential is equal to or smaller than 3.0, a repulsive force may be easily applied between the precipitate and the surface of the back coating layer. The inventors have surmised that preventing the precipitate from being strongly stuck to the surface of the back coating layer by this repulsive force may contribute to a decrease in the generation frequency of the missing pulse.

However, the invention is not limited to the above surmise and other surmises described in the specification.

From a viewpoint of further decreasing the generation frequency of the missing pulse, the isoelectric point of the surface zeta potential of the magnetic layer is preferably equal to or smaller than 3.7, more preferably equal to or smaller than 3.6, even more preferably equal to or smaller than 3.5, still preferably equal to or smaller than 3.4, and still more preferably equal to or smaller than 3.3.

As will be described later in detail, the isoelectric point of the surface zeta potential of the magnetic layer can be controlled by the kind of a component used for forming the magnetic layer, a formation step of the magnetic layer, and the like. From a viewpoint of availability of a component (for example, binding agent) used for forming the magnetic layer, the isoelectric point of the surface zeta potential of the magnetic layer is preferably equal to or greater than 2.0, more preferably equal to or greater than 2.5, even more preferably equal to or greater than 2.6, and still preferably equal to or greater than 2.7.

From a viewpoint of further decreasing the generation frequency of the missing pulse, the isoelectric point of the surface zeta potential of the back coating layer is preferably equal to or smaller than 2.9, more preferably equal to or smaller than 2.8, even more preferably equal to or smaller than 2.7, and still more preferably equal to or smaller than 2.6, and still even more preferably equal to or smaller than 2.5.

As will be described later in detail, the isoelectric point of the surface zeta potential of the back coating layer can be controlled by the kind of a component used for forming the back coating layer, a formation step of the back coating layer, and the like. From a viewpoint of availability of a component (for example, binding agent) used for forming the back coating layer, the isoelectric point of the surface zeta potential of the back coating layer is preferably equal to or greater than 1.5, more preferably equal to or greater than 1.8, and even more preferably equal to or greater than 2.0.

Next, the magnetic layer, the back coating layer, and the like of the magnetic tape will be described more specifically.

Magnetic Layer

Ferromagnetic Powder

As the ferromagnetic powder included in the magnetic layer, ferromagnetic powder normally used in the magnetic layer of various magnetic recording media can be used. It is preferable to use ferromagnetic powder having a small average particle size, from a viewpoint of improvement of recording density of the magnetic tape. From this viewpoint, ferromagnetic powder having an average particle size equal to or smaller than 50 nm is preferably used, and ferromagnetic powder having an average particle size equal to or smaller than 40 nm is more preferably used, as the ferromagnetic powder. Meanwhile, the average particle size of the ferromagnetic powder is preferably equal to or greater than 5 nm, more preferably equal to or greater than 10 nm, even more preferably equal to or greater than 15 nm, and still preferably equal to or greater than 20 nm, from a viewpoint of stability of magnetization.

As a preferred specific example of the ferromagnetic powder, hexagonal ferrite powder can be used. For details of the hexagonal ferrite powder, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to, for example.

As a preferred specific example of the ferromagnetic powder, metal powder can also be used. For details of the metal powder, descriptions disclosed in paragraphs 0137 to 0141 of JP2011-216149A and paragraphs 0009 to 0023 of JP2005-251351A can be referred to, for example.

As a preferable specific example of the ferromagnetic powder, ε-iron oxide powder can also be used. As a manufacturing method of the ε-iron oxide powder, a manufacturing method from a goethite, a reverse micelle method, and the like are known. All of the manufacturing methods are well known. In addition, regarding a method of manufacturing the ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. S1, pp. S280 to S284, J. Mater. Chem. C, 2013, 1, pp. 5200 to 5206 can be referred, for example. However, the manufacturing method of the ε-iron oxide powder capable of being used as the ferromagnetic powder in the magnetic layer is not limited.

In the invention and the specification, average particle sizes of various powder such as the ferromagnetic powder and the like are values measured by the following method with a transmission electron microscope, unless otherwise noted.

The powder is imaged at a magnification ratio of 100,000 with a transmission electron microscope, the image is printed on photographic printing paper so as to have the total magnification of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of the plurality of particles not only includes an aspect in which particles configuring the aggregate are directly in contact with each other, but also includes an aspect in which a binding agent or an additive which will be described later is interposed between the particles. A term "particles" is also used for describing the powder.

As a method of collecting a sample powder from the magnetic tape in order to measure the particle size, a method disclosed in a paragraph 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, and in a case of the definition (2), the average particle size is an average plate diameter. In a case of the definition (3), the average particle size is an average diameter (also referred to as an average particle diameter).

The content (filling percentage) of the ferromagnetic powder of the magnetic layer is preferably 50% to 90% by mass and more preferably 60% to 90% by mass. The components other than the ferromagnetic powder of the magnetic layer are at least a binding agent and one or more kinds of additives may be further randomly included. A high filling percentage of the ferromagnetic powder in the magnetic layer is preferable from a viewpoint of improvement recording density.

Binding Agent and Curing Agent

The magnetic tape is a coating type magnetic tape and includes a binding agent in the magnetic layer. The binding agent is one or more kinds of resin. As the binding agent, various resins normally used as a binding agent of a coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be homopolymers or copolymers. These resins can be used as the binding agent even in the non-magnetic layer and/or a back coating layer which will be described later.

For the binding agent described above, description disclosed in paragraphs 0028 to 0031 of JP2010-024113A can be referred to. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC) under the following measurement conditions. The weight-average molecular weight of the binding agent shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In one aspect, as the binding agent, a binding agent including an acidic group can be used. The acidic group of the invention and the specification is used as a meaning including a state of a group capable of emitting $H^+$ in water or a solvent including water (aqueous solvent) to dissociate anions and a salt thereof. Specific examples of the acidic group include a sulfonic acid group, a sulfate group, a carboxyl group, a phosphate group, and a salt thereof. For example, a salt of sulfonic acid group ($—SO_3H$) is represented by $—SO_3M$, and M represents a group representing an atom (for example, alkali metal atom or the like) which may be cations in water or in an aqueous solvent. The same applies to aspects of salt of various groups described above. As an example of the binding agent including the acidic group, a resin including at least one kind of acidic group selected from the group consisting of a sulfonic acid group and a salt thereof (for example, a polyurethane resin or a vinyl chloride resin) can be used. However, the resin included in the magnetic layer is not limited to these resins. In addition, in the binding agent including the acidic group, a content of the acidic group can be, for example, 0.03 to 0.50 meq/g. The content of various functional groups such as the acidic group included in the resin can be obtained by a well-known method in accordance with the kind of the functional group. The amount of the binding agent used in a magnetic layer forming composition can be, for example, 1.0 to 30.0 parts by mass with respect to 100.0 parts by mass of the ferromagnetic powder.

In regards to the controlling of the isoelectric point of the surface zeta potential of the magnetic layer, the inventors have surmised that formation of the magnetic layer so that the acidic component is unevenly distributed to a surface portion of the magnetic layer contributes to a decrease in value of the isoelectric point. In addition, it is surmised that formation of the magnetic layer so as to decrease the amount of a basic component present in the surface portion of the magnetic layer also contributes to a decrease in value of the isoelectric point. The acidic component is used as a meaning including a state of a component capable of emitting $H^+$ in water or an aqueous solvent to dissociate anions and a salt thereof. The basic component is used as a meaning including a state of a component capable of emitting $OH^-$ in water or an aqueous solvent to dissociate cations and a salt thereof. For example, it is thought that, in a case of using the acidic component, uneven distribution of the acidic component to the surface portion of the magnetic layer contributes to a decrease in value of the isoelectric point of the surface zeta potential of the magnetic layer to control the isoelectric point to be equal to or smaller than 3.8. For example, it is thought that, in a step of applying a magnetic layer forming composition onto a non-magnetic support directly or through a non-magnetic layer, the applying which is performed in an alternating magnetic field by applying an alternating magnetic field contributes to formation of a magnetic layer in which the acidic component is unevenly distributed to the surface portion. As the acidic component, for example, a binding agent including an acidic group can be used. In addition, it is surmised that, in a case of using the binding agent including an acidic group, in a preparation step of the magnetic layer forming composition, the addition (additional addition) of the binding agent even in a case of preparing a dispersion liquid (magnetic liquid) including ferromagnetic powder and the binding agent and then mixing the magnetic liquid with other components, contributes to formation of a magnetic layer in which the binding agent including the acidic group is unevenly distributed to the surface portion. The formation of the magnetic layer will be described later more specifically.

In addition, a curing agent can also be used together with the resin which can be used as the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. This point is the same as regarding a layer formed by using a composition, in a case where the composition used for forming the other layer includes the curing agent. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of hardness of the magnetic layer.

Additives

The magnetic layer includes ferromagnetic powder and the binding agent, and may include one or more kinds of additives, if necessary. As the additives, the curing agent described above is used as an example. In addition, examples of the additive included in the magnetic layer include non-magnetic powder (for example, inorganic powder or carbon black), a lubricant, a dispersing agent, a dispersing assistant, an antibacterial agent, an antistatic agent, and an antioxidant. As the non-magnetic powder, non-magnetic powder which can function as an abrasive, non-magnetic powder (for example, non-magnetic colloid particles) which can function as a projection formation agent which forms projections suitably protruded from the surface of the magnetic layer, and the like can be used. An average particle size of colloidal silica (silica colloid particles) shown in the examples which will be described later is a value obtained by a method disclosed in a measurement method of an average particle diameter in a paragraph 0015 of JP2011-048878A. As the additives, a commercially available product can be suitably selected according to the desired properties or manufactured by a well-known method, and can be used with any amount. As an example of the additive which can be used in the magnetic layer including the abrasive, a dispersing agent disclosed in paragraphs 0012 to 0022 of JP2013-131285A can be used as a dispersing agent for improving dispersibility of the abrasive. For example, for the lubricant, descriptions disclosed in paragraphs 0030 to 0033, 0035, and 0036 of JP2016-126817A can be referred to. The non-magnetic layer may include a lubricant. For the lubricant which may be included in the non-magnetic layer, descriptions disclosed in paragraphs 0030, 0031, 0034, 0035, and 0036 of JP2016-126817A can be referred to. For the dispersing agent, a description disclosed in paragraphs 0061 and 0071 of JP2012-133837A can be referred to. The dispersing agent may be included in the non-magnetic layer. For the dispersing agent which can be included in the non-magnetic layer, a description disclosed in a paragraph 0061 of JP2012-133837A can be referred to.

The magnetic layer described above can be provided on the surface of the non-magnetic support directly or indirectly through the non-magnetic layer.

Back Coating Layer

The back coating layer at least includes non-magnetic powder and a binding agent. As the non-magnetic powder included in the back coating layer, any one or both of carbon black and non-magnetic powder other than carbon black can be used. As the non-magnetic powder other than carbon black, powder of an inorganic substance (inorganic powder) can be used. Specific examples thereof include inorganic powder of iron oxide such as α-iron oxide, titanium oxide such as titanium dioxide, cerium oxide, tin oxide, tungsten oxide, ZnO, $ZrO_2$, $SiO_2$, $Cr_2O_3$, α-alumina, β-alumina, γ-alumina, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, and silicon carbide. For the non-magnetic powder included in the back coating layer, the description regarding the non-magnetic powder included in the non-magnetic layer which will be described later can also be referred to.

A shape of the non-magnetic powder other than carbon black may be any of a needle shape, a sphere shape, a polyhedron shape, and a planar shape. An average particle size of the non-magnetic powder is preferably 0.01 to 0.20 μm and more preferably 0.01 to 0.15 μm. In addition, a specific surface area of the non-magnetic powder obtained by a Brunauer-Emmett-Teller (BET) method (BET specific surface area) is preferably 1 to 100 m$^2$/g, more preferably 5 to 70 m$^2$/g, and even more preferably 10 to 65 m$^2$/g. Meanwhile, an average particle size of carbon black is, for example, 5 to 80 nm, preferably 10 to 50 nm, and more preferably 10 to 40 nm. For the content (filling percentage) of the non-magnetic powder in the back coating layer, the description regarding the non-magnetic powder of the non-magnetic layer which will be described later can be referred to.

The back coating layer further includes a binding agent and can randomly include well-known additives. The amount of the binding agent used in a back coating layer forming composition can be, for example, 1.0 to 30.0 parts by mass with respect to 100.0 parts by mass of the non-magnetic powder.

In one aspect, as the binding agent of the back coating layer, a binding agent including an acidic group can be used. For details of the binding agent including the acidic group, the above description can be referred to.

For other details of the binding agent, additives, and the like of the back coating layer, a well-known technology regarding the back coating layer can be applied, and a well-known technology regarding the magnetic layer and/or the non-magnetic layer can be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

In regards to the controlling of the isoelectric point of the surface zeta potential of the back coating layer, the inventors have surmised that formation of the back coating layer so that the acidic component is unevenly distributed to a surface portion of the back coating layer contributes to a decrease in value of the isoelectric point. In addition, it is surmised that formation of the back coating layer so as to decrease the amount of a basic component present in the surface portion of the back coating layer also contributes to a decrease in value of the isoelectric point. For example, it is thought that, in a case of using the acidic component, uneven distribution of the acidic component to the surface portion of the back coating layer contributes to a decrease in value of the isoelectric point of the surface zeta potential of the back coating layer to control the isoelectric point to be equal to or smaller than 3.0. For example, the inventors have thought that, in a step of applying a back coating layer forming composition onto a non-magnetic support, the applying which is performed in an alternating magnetic field by applying an alternating magnetic field contributes to formation of a back coating layer in which the acidic component is unevenly distributed to the surface portion. As the acidic component, for example, a binding agent including an acidic group can be used. In addition, the inventors have surmised that, in a case of using the binding agent including an acidic group, in a preparation step of the back coating layer forming composition, the addition (additional addition) of the binding agent even in a case of preparing a dispersion liquid including non-magnetic powder and the binding agent and then mixing this dispersion liquid with other components, contributes to formation of a back coating layer in which the binding agent including the acidic group is unevenly distributed to the surface portion. The formation of the back coating layer will be described later more specifically.

Non-Magnetic Layer

Next, the non-magnetic layer will be described. The magnetic tape may include a magnetic layer directly on the surface of the non-magnetic support or may include a magnetic layer on the surface of the non-magnetic support directly or indirectly through the non-magnetic layer including the non-magnetic powder and the binding agent. The non-magnetic powder used in the non-magnetic layer may be inorganic powder or organic powder. In addition, carbon black and the like can be used. Examples of the inorganic powder include powder of metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-024113A can be referred to. The content (filling percentage) of the non-magnetic powder of the non-magnetic layer is preferably 50% to 90% by mass and more preferably 60% to 90% by mass.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

In the invention and the specification, the non-magnetic layer also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m(100 Oe), or a layer having a residual magnetic flux density equal to or smaller than 10 mT and coercivity equal to or smaller than 7.96 kA/m(100 Oe). It is preferable that the non-magnetic layer does not have a residual magnetic flux density and coercivity.

Non-Magnetic Support

Next, the non-magnetic support (hereinafter, also simply referred to as a "support") will be described. As the non-magnetic support, well-known components such as polyethylene terephthalate, polyethylene naphthalate, polyamide, polyamide imide, and aromatic polyamide subjected to biaxial stretching are used. Among these, polyethylene terephthalate, polyethylene naphthalate, and polyamide are preferable. Corona discharge, plasma treatment, easy-bonding treatment, or heat treatment may be performed with respect to these supports in advance.

Various Thicknesses

A thickness of the non-magnetic support is preferably 3.00 to 20.00 μm, more preferably 3.00 to 10.00 μm, and even more preferably 3.00 to 6.00 μm.

A thickness of the magnetic layer can be optimized according to a saturation magnetization amount of a magnetic head used, a head gap length, a recording signal band, and the like. The thickness of the magnetic layer is normally 0.01 μm to 0.15 μm, and is preferably 0.02 μm to 0.12 μm and more preferably 0.03 μm to 0.10 μm from a viewpoint of realization of high-density recording. The magnetic layer may be at least one layer, or the magnetic layer can be separated into two or more layers having different magnetic properties, and a configuration regarding a well-known multilayered magnetic layer can be applied. A thickness of the magnetic layer which is separated into two or more layers is a total thickness of these layers.

A thickness of the non-magnetic layer is, for example, 0.10 to 1.50 µm and is preferably 0.10 to 1.00 µm.

A thickness of the back coating layer is preferably equal to or smaller than 0.90 µm and more preferably 0.10 to 0.70 µm.

The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed with a scanning electron microscope. In the cross section observation, various thicknesses can be acquired as a thickness acquired at one portion of the cross section, or an arithmetical mean of thicknesses acquired at a plurality of portions of two or more portions, for example, two portions which are randomly extracted. In addition, the thickness of each layer may be acquired as a designed thickness calculated according to the manufacturing conditions.

Manufacturing Method of Magnetic Tape

Each composition for forming the magnetic layer, the back coating layer, and the non-magnetic layer which is randomly provided, normally includes a solvent, together with various components described above. As the solvent, various organic solvents generally used for manufacturing a coating type magnetic recording medium can be used. The amount of the solvent in each layer forming composition is not particularly limited, and can be set to be the same as that of each layer forming composition of a typical coating type magnetic recording medium. Steps of preparing the composition for forming each layer can generally include at least a kneading step, a dispersing step, and a mixing step provided before and after these steps, if necessary. Each step may be divided into two or more stages. The components used in the preparation of each layer forming composition may be added at an initial stage or in a middle stage of any step. In addition, each component may be separately added in two or more steps. For example, in the preparation of the magnetic layer forming composition, the binding agent including an acidic group can be separately added through two or more steps. It is preferable that a dispersion liquid is prepared by mixing some components including the ferromagnetic powder among the various components of the magnetic layer forming composition with the binding agent including an acidic group and dispersing the mixture in a solvent, and the binding agent including an acidic group is also added in a step of mixing the dispersion liquid with the remaining components and performing dispersing, because it is possible to contribute to the controlling of the isoelectric point of a surface zeta potential of the magnetic layer to be equal to or smaller than 3.8. In addition, it is preferable that the non-magnetic powder which can function as an abrasive is dispersed separately from the ferromagnetic powder, and then other components such as the ferromagnetic powder are mixed and dispersed, in order to improve dispersibility of the ferromagnetic powder and the non-magnetic powder (abrasive). For example, in the preparation of the back coating layer forming composition, the binding agent including an acidic group can be separately added through two or more steps. It is preferable that a dispersion liquid is prepared by mixing some components including the non-magnetic powder among the various components of the back coating layer forming composition with the binding agent including an acidic group and dispersing the mixture in a solvent, and the binding agent including an acidic group is also added in a step of mixing the dispersion liquid with the remaining components and performing dispersing, because it is possible to contribute to the controlling of the isoelectric point of a surface zeta potential of the back coating layer to be equal to or smaller than 3.0.

In order to prepare each layer forming composition, a well-known technology can be used. In the kneading step, an open kneader, a continuous kneader, a pressure kneader, or a kneader having a strong kneading force such as an extruder is preferably used. The details of the kneading processes of these kneaders are disclosed in JP1989-106338A (JP-H01-106338A) and JP1989-079274A (JP-H01-079274A). In addition, in order to disperse each layer forming composition, as a dispersion medium, at least one or more kinds of dispersion beads selected from the group consisting of glass beads and other dispersion beads can be used. As such dispersion beads, zirconia beads, titania beads, and steel beads which are dispersion beads having high specific gravity are suitable. These dispersion beads can be used by optimizing a particle diameter (bead diameter) and a filling percentage. As a disperser, a well-known disperser can be used. Each layer forming composition may be filtered by a well-known method before performing the coating step. The filtering can be performed by using a filter, for example. As the filter used in the filtering, a filter having a hole diameter of 0.01 to 3 µm (for example, filter made of glass fiber or filter made of polypropylene) can be used, for example.

The magnetic layer can be formed by directly applying the magnetic layer forming composition onto the surface of the non-magnetic support or performing multilayer coating with the non-magnetic layer forming composition in order or at the same time. The back coating layer can be formed by applying the back coating layer forming composition onto the surface of the non-magnetic support where the magnetic layer is formed or the surface thereof on a side opposite to the surface where the magnetic layer is to be formed. For details of the coating for forming each layer, a description disclosed in a paragraph 0066 of JP2010-231843A can be referred to.

The coating of the magnetic layer forming composition performed in an alternating magnetic field can contribute to the controlling of the isoelectric point of a surface zeta potential of the magnetic layer to be equal to or smaller than 3.8. It is surmised that this is because, an acidic component (for example, the binding agent including an acidic group) is easily unevenly distributed to a surface portion of a coating layer of the magnetic layer forming composition due to the applied alternating magnetic field, and thus, by drying this coating layer, a magnetic layer in which the acidic component is unevenly distributed to the surface portion is obtained. The applying of the alternating magnetic field can be performed by disposing a magnet in a coating device so that the alternating magnetic field is applied vertically to the surface of the coating layer of the magnetic layer forming composition. A magnetic field strength of the alternating magnetic field can be, for example, set as approximately 0.05 to 3.00 T. However, there is no limitation to this range.

In addition, the coating of the back coating layer forming composition performed in an alternating magnetic field can contribute to the controlling of the isoelectric point of a surface zeta potential of the back coating layer to be equal to or smaller than 3.0. It is surmised that this is because, an acidic component (for example, the binding agent including an acidic group) is easily unevenly distributed to a surface portion of a coating layer of the back coating layer forming composition due to the applied alternating magnetic field, and thus, by drying this coating layer, a back coating layer in which the acidic component is unevenly distributed to the surface portion is obtained. The applying of the alternating magnetic field can be performed by disposing a magnet in a coating device so that the alternating magnetic field is applied vertically to the surface of the coating layer of the back coating layer forming composition. A magnetic field strength of the alternating magnetic field can be, for example, set as approximately 0.05 to 3.00 T. However, there is no limitation to this range.

The "vertical" in the invention and the specification does not mean only a vertical direction in the strict sense, but also includes a range of errors allowed in the technical field of the invention. For example, the range of errors means a range of less than ±10° from an exact vertical direction.

For various other steps for manufacturing the magnetic tape, a well-known technology can be applied. For details of the various steps, descriptions disclosed in paragraphs 0067 to 0070 of JP2010-231843A can be referred to, for example. It is preferable that the coating layer of the magnetic layer forming composition is subjected to an alignment process, while this coating layer is wet (not dried). For the alignment process, various well-known technologies such as a description disclosed in a paragraph 0067 of JP2010-231843A can be used. For example, a homeotropic alignment process can be performed by a well-known method such as a method using a polar opposing magnet. In an alignment zone, it is possible to control a drying speed of the coating layer by a temperature of dry air, an air flow, and/or a transportation speed of the magnetic tape in the alignment zone. In addition, the coating layer may be preliminarily dried before being transported to the alignment zone. In a case of performing the alignment process, it is preferable to apply a magnetic field (for example, DC magnetic field) for aligning the ferromagnetic powder with respect to the coating layer of the magnetic layer forming composition applied in the alternating magnetic field.

As described above, it is possible to obtain the magnetic tape according to one aspect of the invention. The magnetic tape is normally accommodated in a magnetic tape cartridge and the magnetic tape cartridge is mounted in a magnetic tape apparatus (generally referred to as a "drive"). A servo pattern can also be formed on the magnetic layer of the magnetic tape by a well-known method, in order to allow head tracking servo to be performed in the drive.

According to the magnetic tape, even in a case where the sliding between the surface of the magnetic tape and the magnetic head is repeated, after the magnetic tape is exposed to a temperature change from a low temperature to a high temperature under high humidity, it is possible to decrease the generation frequency of the missing pulse. In one aspect, high humidity can be relative humidity of 70% to 100%, a low temperature can be higher than 0° C. and equal to or lower than 15° C., a high temperature can be 30° C. to 50° C., and a temperature change from a low temperature to a high temperature can be a temperature change approximately from 15° C. to 50° C.

Magnetic Tape Cartridge

One aspect of the invention relates to a magnetic tape cartridge including the magnetic tape.

In the magnetic tape cartridge, the magnetic tape is generally accommodated in a cartridge main body in a state of being wound around a reel. The reel is rotatably provided in the cartridge main body. As the magnetic tape cartridge, a single reel type magnetic tape cartridge including one reel in a cartridge main body and a twin reel type magnetic tape cartridge including two reels in a cartridge main body are widely used. In a case where the single reel type magnetic tape cartridge is mounted in the magnetic tape apparatus (drive) in order to record and/or reproduce information (magnetic signals) on the magnetic tape, the magnetic tape is drawn from the magnetic tape cartridge and wound around the reel on the drive side. A magnetic head is disposed on a magnetic tape transportation path from the magnetic tape cartridge to a winding reel. Sending and winding of the magnetic tape are performed between a reel (supply reel) on the magnetic tape cartridge side and a reel (winding reel) on the drive side. In the meantime, the magnetic head comes into contact with and slides on the surface of the magnetic layer of the magnetic tape, and accordingly, the recording and/or reproduction of information is performed. With respect to this, in the twin reel type magnetic tape cartridge, both reels of the supply reel and the winding reel are provided in the magnetic tape cartridge. The magnetic tape cartridge may be any of single reel type magnetic tape cartridge and twin reel type magnetic tape cartridge. The magnetic tape cartridge may include the magnetic tape according to one aspect of the invention, and a well-known technology can be applied for other configurations.

Magnetic Tape Apparatus

One aspect of the invention relates to a magnetic tape apparatus including the magnetic tape and a magnetic head.

In the invention and the specification, the "magnetic tape apparatus" means a device capable of performing at least one of the recording of information on the magnetic tape or the reproducing of information recorded on the magnetic tape. Such an apparatus is generally called a drive. The magnetic tape apparatus can be a sliding type magnetic tape apparatus. The sliding type apparatus is an apparatus in which the surface of the magnetic layer comes into contact with and slides on the magnetic head, in a case of performing the recording of information on the magnetic tape and/or reproducing of the recorded information.

The magnetic head included in the magnetic tape apparatus can be a recording head capable of performing the recording of information on the magnetic tape, or can be a reproducing head capable of performing the reproducing of information recorded on the magnetic tape. In addition, in one aspect, the magnetic tape apparatus can include both of a recording head and a reproducing head as separate magnetic heads. In another aspect, the magnetic head included in the magnetic tape can also have a configuration of comprising both of a recording element and a reproducing element in one magnetic head. As the reproducing head, a magnetic head (MR head) including a magnetoresistive (MR) element capable of sensitively reading information recorded on the magnetic tape as a reproducing element is preferable. As the MR head, various well-known MR heads can be used. In addition, the magnetic head which performs the recording of information and/or the reproducing of information may include a servo pattern reading element. Alternatively, as a head other than the magnetic head which performs the recording of information and/or the reproducing of information, a magnetic head (servo head) comprising a servo pattern reading element may be included in the magnetic tape apparatus.

In the magnetic tape apparatus, the recording of information on the magnetic tape and/or the reproducing of information recorded on the magnetic tape can be performed by bringing the surface of the magnetic layer of the magnetic tape into contact with the magnetic head and sliding. The magnetic tape apparatus may include the magnetic tape according to one aspect of the invention and well-known technologies can be applied for other configurations.

EXAMPLES

Hereinafter, the invention will be described with reference to examples. However, the invention is not limited to aspects shown in the examples. "Parts" and "%" in the following description mean "parts by mass" and "% by mass", unless otherwise noted. In addition, steps and evaluations described below are performed in an environment of an atmosphere temperature of 23° C.±1° C., unless otherwise noted.

A "binding agent A" described below is a SO$_3$Na group-containing polyurethane resin (weight-average molecular weight: 70,000, SO$_3$Na group: 0.20 meq/g).

A "binding agent B" described below is a vinyl chloride copolymer (product name: MR110, SO$_3$K group-containing vinyl chloride copolymer, SO$_3$K group: 0.07 meq/g) manufactured by Kaneka Corporation.

Manufacturing of Magnetic Tape

Example 1

(1) Preparation of Alumina Dispersion 3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a SO$_3$Na group-containing polyester polyurethane resin (UR-4800 (SO$_3$Na group: 0.08 meq/g) manufactured by Toyobo Co., Ltd.), and 570.0 parts of a mixed solvent of methyl ethyl ketone and cyclohexanone (mass ratio of 1:1) as a solvent were mixed with 100.0 parts of alumina powder (HIT-80 manufactured by Sumitomo Chemical Co., Ltd.) having a gelatinization ratio of approximately 65% and a BET specific surface area of 20 m$^2$/g, and dispersed in the presence of zirconia beads by a paint shaker for 5 hours. After the dispersion, the dispersion liquid and the beads were separated by a mesh and an alumina dispersion was obtained.

(2) Magnetic Layer Forming Composition List

| | |
|---|---|
| Magnetic Liquid | |
| Ferromagnetic powder | 100.0 parts |
| Hexagonal barium ferrite powder having average particle size (average plate diameter) of 21 nm | |
| Binding agent (see Table 1) | see Table 1 |
| Cyclohexanone | 150.0 parts |
| Methyl ethyl ketone | 150.0 parts |
| Abrasive Solution | |
| Alumina dispersion prepared in the section (I) | 6.0 parts |
| Silica Sol (projection forming agent liquid) | |
| Colloidal silica (Average particle size: 120 nm) | 2.0 parts |
| Methyl ethyl ketone | 1.4 parts |
| Other Components | |
| Stearic acid | 2.0 parts |
| Stearic acid amide | 0.2 parts |
| Butyl stearate | 2.0 parts |
| Polyisocyanate (CORONATE (registered trademark) manufactured by Tosoh Corporation) | 2.5 parts |
| Finishing Additive Solvent | |
| Cyclohexanone | 200.0 parts |
| Methyl ethyl ketone | 200.0 parts |

(3) Non-Magnetic Layer Forming Composition List

| | |
|---|---|
| Non-magnetic inorganic powder: α-iron oxide | 100.0 parts |
| Average particle size (average long axis length): 0.15 μm | |
| Average acicular ratio: 7 | |
| BET specific surface area: 52 m$^2$/g | |
| Carbon black | 20.0 parts |
| Average particle size: 20 nm | |
| Binding agent A | 18.0 parts |
| Stearic acid | 2.0 parts |
| Stearic acid amide | 0.2 parts |
| Butyl stearate | 2.0 parts |
| Cyclohexanone | 300.0 parts |
| Methyl ethyl ketone: 300.0 parts | |

(4) Back Coating Layer Forming Composition List

| | |
|---|---|
| Non-magnetic inorganic powder: a-iron oxide | 80.0 parts |
| Average particle size (average long axis length): 0.15 μm | |
| Average acicular ratio: 7 | |
| BET specificsurface area: 52 m$^2$/g | |
| Carbon black: 20.0 parts | |
| Average particle size: 20 nm | |
| Binding agent (see Table 1) | see Table 1 |
| Phenylphosphonic acid | 3.0 parts |
| Methyl ethyl ketone | 155.0 parts |
| Polyisocyanate | 5.0 parts |
| Cyclohexanone | 355.0 parts |

(5) Preparation of Each Layer Forming Composition

The magnetic layer forming composition was prepared by the following method.

The magnetic liquid was prepared by dispersing (beads-dispersing) various components described above by using a batch type vertical sand mill for 24 hours. Zirconia beads having a bead diameter of 0.5 mm were used as the dispersion beads.

The prepared magnetic liquid, the abrasive solution, the binding agent A additionally added (0.1 parts with respect to 100.0 parts of the ferromagnetic powder of the magnetic liquid), and other components (silica sol, other components, and finishing additive solvent) were mixed with each other and beads-dispersed for 5 minutes by using the sand mill, and the treatment (ultrasonic dispersion) was performed with a batch type ultrasonic device (20 kHz, 300 W) for 0.5 minutes. After that, the obtained mixed solution was filtered by using a filter having a hole diameter of 0.5 μm, and the magnetic layer forming composition was prepared.

The non-magnetic layer forming composition was prepared by the following method.

Various components described above excluding the lubricant (stearic acid, stearic acid amide, and butyl stearate), cyclohexanone, and methyl ethyl ketone were dispersed by using batch type vertical sand mill for 24 hours to obtain a dispersion liquid. As the dispersion beads, zirconia beads having a bead diameter of 0.5 mm were used. After that, the remaining components were added into the obtained dispersion liquid and stirred with a dissolver. The dispersion liquid obtained as described above was filtered with a filter having a hole diameter of 0.5 μm and a non-magnetic layer forming composition was prepared.

The back coating layer forming composition was prepared by the following method.

Various components described above excluding polyisocyanate and cyclohexanone were kneaded by an open kneader and diluted, and were subjected to a dispersion process of 12 passes, with a transverse beads mill disperser and zirconia beads having a bead diameter of 1 mm, by setting a bead filling percentage as 80 volume %, a circumferential speed of rotor distal end as 10 m/sec, and a retention time for 1 pass as 2 minutes. After that, the remaining components and the binding agent A to be additionally added (0.1 parts with respect to 100.0 parts of the non-magnetic powder (non-magnetic inorganic powder and carbon black)) were added into the obtained dispersion liquid and stirred with a dissolver. The dispersion liquid obtained as described above was filtered with a filter having a hole diameter of 1 μm and a back coating layer forming composition was prepared.

(6) Manufacturing Method of Magnetic Tape

The non-magnetic layer forming composition prepared in the section (5) was applied to a surface of a support made of polyethylene naphthalate having a thickness of 5.00 μm so that the thickness after the drying becomes 1.00 μm and was dried to form a non-magnetic layer.

Then, in a coating device disposed with a magnet for applying an alternating magnetic field, the magnetic layer forming composition prepared in the section (5) was applied onto the surface of the non-magnetic layer so that the thickness after the drying becomes 0.10 μm, while applying an alternating magnetic field (magnetic field strength: 0.15 T), to form a coating layer. The applying of the alternating magnetic field was performed so that the alternating magnetic field was applied vertically to the surface of the coating layer. After that, a homeotropic alignment process was performed by applying a magnetic field having a DC magnetic field strength of 0.30 T in a vertical direction with respect to a surface of a coating layer, while the coating layer of the magnetic layer forming composition is wet (not dried). After that, the coating layer was dried to form a magnetic layer.

After that, the back coating layer forming composition prepared in the section (5) was applied to the surface of the support made of polyethylene naphthalate on a side opposite to the surface where the non-magnetic layer and the magnetic layer were formed, so that the thickness after the drying becomes 0.50 μm, and was dried to form a back coating layer. The coating of the back coating layer forming composition was performed while applying the alternating magnetic field (magnetic field strength: 0.15 T) vertically to the surface of the coating layer of the back coating layer forming composition, in a coating device disposed with a magnet for applying the alternating magnetic field.

After that, a surface smoothing treatment (calender process) was performed by using a calender roll configured of only a metal roll, at a speed of 100 m/min, linear pressure of 294 kN/m (300 kg/cm), and a calender temperature (surface temperature of a calender roll) of 100° C.

Then, the heat treatment was performed in the environment of the atmosphere temperature of 70° C. for 36 hours. After the heat treatment, the slitting was performed to have a width of ½ inches (1 inch is 0.0254 meters), and a servo pattern was formed on the magnetic layer by a commercially available servo writer.

By doing so, a magnetic tape of Example 1 was manufactured.

Examples 2 to 5 and Comparative Examples 1 to 10

A magnetic tape was manufactured by the same method as in Example 1, except that various conditions were changed as shown in Table 1.

In Table 1, in the examples and the comparative examples in which "performed" is shown in the column of the additional addition of the binding agent, the additional addition of the binding agent A was performed during the preparation of the magnetic layer forming composition and/or the back coating layer forming composition, in the same manner as in Example 1. On the other hand, in the comparative examples in which "not performed" is shown in this column, the additional addition of the binding agent A was not performed during the preparation of the magnetic layer forming composition and/or the back coating layer forming composition.

In Table 1, in the examples and the comparative examples in which "performed" is shown in the column of the alternating magnetic field application during coating, the step subsequent to the coating step of the magnetic layer forming composition and/or the back coating layer forming composition was performed by the same method as in Example 1. That is, the application of the alternating magnetic field was performed during coating of the magnetic layer forming composition and/or the back coating layer forming composition in the same manner as in Example 1. On the other hand, in the comparative examples in which "not performed" is shown in this column, the step subsequent to the coating step of the magnetic layer forming composition and/or the back coating layer forming composition was performed by the same method as in Example 1, except that the application of the alternating magnetic field was not performed during the coating of the magnetic layer forming composition and/or the back coating layer forming composition.

Evaluation of Physical Properties of Magnetic Tape (1) Isoelectric Point of Surface Zeta Potential of Magnetic Layer Six samples for isoelectric point measurement were cut out from each magnetic tape of the examples and the comparative examples and disposed in the measurement cell of two samples in one measurement. In the measurement cell, a sample installing surface and a surface of the back coating layer of the sample were bonded to each other by using a double-sided tape in upper and lower sample table (size of each sample installing surface is 1 cm×2 cm) of the measurement cell. In a case where an electrolyte flows in the measurement cell after disposing two samples as described above, the surface of the magnetic layer of the two samples bonded to each other on the upper and lower sample table of the measurement cell comes into contact with the electrolyte, and thus, the surface zeta potential of the magnetic layer can be measured. The measurement was performed three times in total by using two samples in each measurement, and the isoelectric points of the surface zeta potential of the magnetic layer were obtained. An arithmetical mean of the obtained three values obtained by three times of the measurement is shown in Table 1, as the isoelectric point of the surface zeta potential of the magnetic layer of each magnetic tape. As a surface zeta potential measurement device, SurPASS manufactured by Anton Paar was used. The measurement conditions were set as follows. Other details of the method of obtaining the isoelectric point are as described above.

Measurement cell: variable gap cell (20 mm×10 mm)
Measurement mode: Streaming Current
Gap: approximately 200 μm
Measurement temperature: room temperature
Ramp Target Pressure/Time: 400,000 Pa (400 mbar)/60 seconds
Electrolyte: KCl aqueous solution having concentration of 1 mmol/L (adjusted pH to 9)

pH adjusting solution: HCl aqueous solution having concentration of 0.1 mol/L or KOH aqueous solution having concentration of 0.1 mol/L Measurement pH: pH 9→pH 3 (measured at 13 measurement points in total at interval of approximately 0.5)

(2) Isoelectric Point of Surface Zeta Potential of Back Coating Layer

Six samples for isoelectric point measurement were cut out from each magnetic tape of the examples and the comparative examples and disposed in the measurement cell of two samples in one measurement. In the measurement cell, a sample installing surface and a surface of the magnetic layer of the sample were bonded to each other by using a double-sided tape in upper and lower sample table (size of each sample installing surface is 1 cm×2 cm) of the measurement cell. In a case where an electrolyte flows in the measurement cell after disposing two samples as described above, the surface of the back coating layer of the two samples bonded to each other on the upper and lower sample table of the measurement cell comes into contact with the electrolyte, and thus, the surface zeta potential of the back coating layer can be measured. The measurement was performed three times in total by using two samples in each measurement, and the isoelectric points of the surface zeta potential of the back coating layer were obtained. An arithmetical mean of the obtained three values obtained by three times of the measurement is shown in Table 1, as the isoelectric point of the surface zeta potential of the back coating layer of each magnetic tape. As a surface zeta potential measurement device, the device disclosed in the section (1) was used, and the measurement conditions were set as shown in the section (1). Other details of the method of obtaining the isoelectric point are as described above.

(3) Missing Pulse Generation Frequency

A magnetic tape cartridge accommodating each magnetic tape (magnetic tape total length of 500 m) of the examples and the comparative examples was stored in a thermo box in which a temperature was maintained to be 10° C. and relative humidity was maintained to be 80%, for 3 hours. After that, the magnetic tape cartridge was extracted from the thermo box (a temperature of the outside air was 23° C. and relative humidity was 50%), and put in a thermo room in which a temperature was maintained to be 32° C. and relative humidity was maintained to be 80%, within 1 minute, and set in a drive of Linear Tape-Open Generation 6 (LTO-G6) manufactured by IBM in this thermo room. After that, in the drive, the magnetic tape in the magnetic tape cartridge was subjected to reciprocating running 1,500 times at tension of 0.6 N and a running speed of 8 m/sec, while bringing the magnetic head of the drive into contact with the surface of the magnetic layer for sliding.

In the thermo room, the magnetic tape cartridge after the running was extracted from the drive, and set in another drive (LTO-G6 drive manufactured by IBM), the magnetic tape was caused to run, and the recording and reproducing of information were performed, while bringing the magnetic head into contact with the surface of the magnetic layer for sliding. A reproducing signal during the running was introduced to an external analog/digital (AD) conversion device. A signal having a reproducing signal amplitude which is decreased 70% or more than an average (average of measured values at each track) was set as a missing pulse, a generation frequency (number of times of the generation) thereof was divided by the total length of the magnetic tape to obtain a missing pulse generation frequency (unit: times/m) per unit length of the magnetic tape (per 1 m). In a case where the missing pulse generation frequency is equal to or smaller than 5.0 number/m, the magnetic tape can be determined as a magnetic tape having high reliability in practice.

The results of the above evaluation are shown in Table 1 (Table 1-1 and Table 1-2).

TABLE 1-1

| | | | Example 1 | Example 2 | Example 3 | Example 4 | Example 5 |
|---|---|---|---|---|---|---|---|
| Formation of magnetic layer | Content of binding agent in magnetic liquid | Binding agent A | 5.0 parts | 10.0 parts | 15.0 parts | 20.0 parts | 10.0 parts |
| | | Binding agent B | 0 parts | 0 parts | 0 parts | 0 parts | 10.0 parts |
| | Additional addition of binding agent | | Performed | Performed | Performed | Performed | Performed |
| | Alternating magnetic field application during coating | | Performed | Performed | Performed | Performed | Performed |
| Formation of back coating layer | Content of binding agent in dispersion liquid | Binding agent A | 5.0 parts | 10.0 parts | 15.0 parts | 20.0 parts | 10.0 parts |
| | | Binding agent B | 0 parts | 0 parts | 0 parts | 0 parts | 10.0 parts |
| | Additional addition of binding agent | | Performed | Performed | Performed | Performed | Performed |
| | Alternating magnetic field application during coating | | Performed | Performed | Performed | Performed | Performed |
| Isoelectric point of surface zeta potential of magnetic layer | | | 3.8 | 3.5 | 3.0 | 2.5 | 3.0 |
| Isoelectric point of surface zeta potential of back coating layer | | | 3.0 | 2.8 | 2.5 | 2.0 | 2.7 |
| Missing pulse generation frequency (times/m) | | | 4.0 | 3.5 | 3.5 | 3.0 | 3.5 |

TABLE 1-2

| | | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|---|---|
| Formation of magnetic layer | Content of binding agent in magnetic liquid | Binding agent A | 5.0 parts | 10.0 parts | 15.0 parts | 20.0 parts | 15.0 parts | 15.0 parts | 0 parts | 10.0 parts | 10.0 parts | 10.0 parts |
| | | Binding agent B | 0 parts | 0 parts | 0 parts | 0 parts | 0 parts | 0 parts | 10 parts | 10 parts | 0 parts | 0 parts |
| | Additional addition of binding agent | | Not performed | Not performed | Not performed | Not performed | Performed | Not performed | Not performed | Not performed | Performed | Not performed |

TABLE 1-2-continued

|  |  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|---|---|
|  | Alternating magnetic field application during coating |  | Not performed | Not performed | Not performed | Not performed | Not performed | Not performed | Not performed | Not performed | Performed | Not performed |
| Formation of back coating layer | Content of binding agent in dispersion liquid | Binding agent A | 5.0 parts | 10.0 parts | 15.0 parts | 20.0 parts | 15.0 parts | 15.0 parts | 0 parts | 10.0 parts | 10.0 parts | 10.0 parts |
|  |  | Binding agent B | 0 parts | 0 parts | 0 parts | 0 parts | 0 parts | 0 parts | 10.0 parts | 10.0 parts | 0 parts | 0 parts |
|  | Additional addition of binding agent |  | Not performed | Not performed | Not performed | Not performed | Performed | Not performed | Not performed | Not performed | Not performed | Performed |
|  | Alternating magnetic field application during coating |  | Not performed | Not performed | Not performed | Not performed | Not performed | Performed | Not performed | Not performed | Not performed | Performed |
| Isoelectric point of surface zeta potential of magnetic layer |  |  | 5.0 | 4.8 | 4.6 | 4.6 | 4.2 | 4.6 | 4.8 | 4.7 | 3.6 | 4.8 |
| Isoelectric point of surface zeta potential of back coating layer |  |  | 4.0 | 3.8 | 3.7 | 3.7 | 4.0 | 4.0 | 4.0 | 4.0 | 3.8 | 2.7 |
| Missing pulse generation frequency (times/m) |  |  | 25.0 | 15.0 | 15.0 | 14.0 | 18.0 | 18.0 | 15.0 | 15.0 | 8.0 | 8.0 |

From the results shown in Table 1, in the magnetic tapes of the examples, it is possible to confirm that the missing pulse generation frequency is lower than those of the magnetic tapes of the comparative examples, even after the magnetic tape was exposed to a temperature change from a low temperature to a high temperature under high humidity.

One aspect of the invention is effective in the technical fields of various magnetic tapes for data storage.

What is claimed is:

1. A magnetic tape comprising:
   a non-magnetic support;
   a magnetic layer including ferromagnetic powder and a binding agent on one surface side of the non-magnetic support; and
   a back coating layer including non-magnetic powder and a binding agent on the other surface side of the non-magnetic support,
   wherein
   an average particle size of the ferromagnetic powder is 5 nm to 21 nm, and
   an isoelectric point of a surface zeta potential of the magnetic layer is equal to or smaller than 3.8, and
   an isoelectric point of a surface zeta potential of the back coating layer is equal to or smaller than 3.0.

2. The magnetic tape according to claim 1,
   wherein the isoelectric point of a surface zeta potential of the magnetic layer is 2.5 to 3.8.

3. The magnetic tape according to claim 1,
   wherein the isoelectric point of a surface zeta potential of the back coating layer is 2.0 to 3.0.

4. The magnetic tape according to claim 1,
   wherein the binding agent of the magnetic layer is a binding agent including an acidic group.

5. The magnetic tape according to claim 4,
   wherein the acidic group includes at least one kind of acidic group selected from the group consisting of a sulfonic acid group and a salt thereof.

6. The magnetic tape according to claim 2,
   wherein the binding agent of the magnetic layer is a binding agent including an acidic group.

7. The magnetic tape according to claim 6,
   wherein the acidic group includes at least one kind of acidic group selected from the group consisting of a sulfonic acid group and a salt thereof.

8. The magnetic tape according to claim 3,
   wherein the binding agent of the magnetic layer is a binding agent including an acidic group.

9. The magnetic tape according to claim 8,
   wherein the acidic group includes at least one kind of acidic group selected from the group consisting of a sulfonic acid group and a salt thereof.

10. The magnetic tape according to claim 1,
    wherein the binding agent of the back coating layer is a binding agent including an acidic group.

11. The magnetic tape according to claim 10,
    wherein the acidic group includes at least one kind of acidic group selected from the group consisting of a sulfonic acid group and a salt thereof.

12. The magnetic tape according to claim 2,
    wherein the binding agent of the back coating layer is a binding agent including an acidic group.

13. The magnetic tape according to claim 12,
    wherein the acidic group includes at least one kind of acidic group selected from the group consisting of a sulfonic acid group and a salt thereof.

14. The magnetic tape according to claim 3,
    wherein the binding agent of the back coating layer is a binding agent including an acidic group.

15. The magnetic tape according to claim 14,
    wherein the acidic group includes at least one kind of acidic group selected from the group consisting of a sulfonic acid group and a salt thereof.

16. The magnetic tape according to claim 4,
    wherein the binding agent of the back coating layer is a binding agent including an acidic group.

17. The magnetic tape according to claim 16,
wherein the acidic group includes at least one kind of acidic group selected from the group consisting of a sulfonic acid group and a salt thereof.

18. The magnetic tape according to claim 1, further comprising:
a non-magnetic layer including non-magnetic powder and a binding agent between the non-magnetic support and the magnetic layer.

19. The magnetic tape according to claim 1,
wherein the isoelectric point of a surface zeta potential of the back coating layer is 1.5 to 2.7.

20. A magnetic tape cartridge comprising:
the magnetic tape according to claim 1.

21. A magnetic tape apparatus comprising:
the magnetic tape according to claim 1; and
a magnetic head.

* * * * *